UNITED STATES PATENT OFFICE.

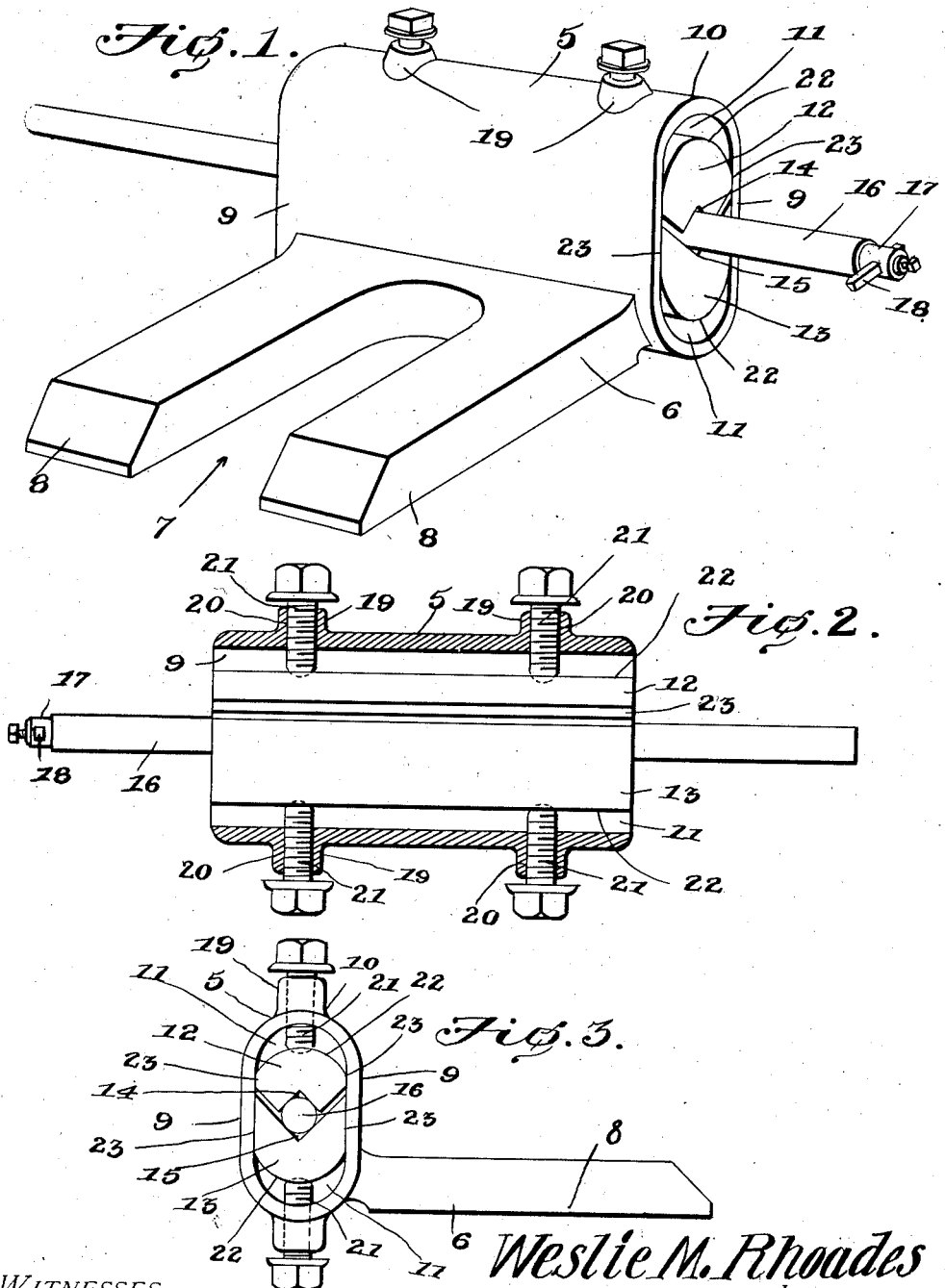

WESLIE M. RHOADES, OF IOLA, KANSAS.

TOOL-HOLDER.

No. 908,804.  Specification of Letters Patent.  Patented Jan. 5, 1909.

Application filed May 28, 1906. Serial No. 319,224.

*To all whom it may concern:*

Be it known that I, WESLIE M. RHOADES, a citizen of the United States, residing at Iola, in the county of Allen and State of Kansas, have invented a new and useful Tool-Holder, of which the following is a specification.

This invention relates to tool-holders for lathes and has for its object to provide a comparatively simple and inexpensive device of this character particularly designed for supporting a boring bar or other suitable tool in position on the lathe.

A further object of the invention is to provide a holder having a pair of adjustable clamping jaws the adjacent faces of which are formed with seating recesses for the reception of the boring bar, whereby said bar may be rotated and adjusted longitudinally and laterally within the holder.

A still further object of the invention is to generally improve this class of devices so as to increase their utility, durability and efficiency as well as to reduce the cost of manufacture.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claim.

In the accompanying drawings forming a part of this specification: Figure 1 is a perspective view of a tool-holder constructed in accordance with my invention. Fig. 2 is a longitudinal sectional view of the same, and, Fig. 3 is an end elevation.

Similar numerals of reference indicate corresponding parts in all of the figures of the drawings.

The improved device comprises an elongated body portion or casing 5 provided with a lateral extension or plate 6 the free end of which is bifurcated at 7 to form a pair of parallel arms or fingers 8 for attachment to a lathe. It will be observed by reference to Fig. 1 that the shank is substantially commensurate in width with the length of the head, the object of this arrangement being to brace the latter throughout its entire extent and thus prevent chattering of the tool which would ensue if the shank were narrow and disposed intermediate of the ends of the head, as is usual.

The casing 5 is formed with parallel side walls 9 and oppositely disposed curved end walls 10 defining a vertically disposed recess or socket 11 in which are mounted for vertical movement the clamping jaws 12 and 13. The adjacent longitudinal edges of the clamping jaws 12 and 13 are formed with angularly disposed recesses 14 and 15 for the reception of a boring bar 16, the latter being mounted for longitudinal and rotary movement between the jaws and provided at one end thereof with a reduced extension 17 carrying a cutting tool 18. The boring bar and cutter, however, form no part of the present invention and it will therefore be understood that bars and cutters of different sizes and shapes may be used in connection with the holder without departing from the spirit of the invention.

The exterior walls of the casing or body portion 5 at the opposite curved ends thereof are formed with spaced projections or lugs 19 having threaded openings 20 formed therein for the reception of clamping screws 21 the free ends of which are adapted to bear against the adjacent curved walls 22 of the clamping jaws for forcing the latter in engagement with the boring bar. The side walls of the clamping jaws are preferably disposed parallel with the adjacent walls of the casing as indicated at 23 so as to prevent rotation and maintain said jaws in vertical alinement with each other. It will thus be seen that by rotating the screws 21 the clamping jaws 12 and 13 carrying the boring bar may be adjusted vertically within the recess or socket 11 thereby to vary the distance between the bar and the lower wall of the casing. The space screws, however, permit the adjustment of the boring bar and clamping jaws to varying angular positions. It will also be observed that when the screws are loosened the boring bar may be adjusted longitudinally of the casing and rotated within the clamping jaws so as to support the cutting tool at any desired angle or inclination with respect to the work, said tool being locked in adjusted position by tightening the clamping screws.

From the foregoing description it is thought that the construction and operation of the device will be readily understood by those skilled in the art and further description thereof is deemed unnecessary.

Having thus described the invention what is claimed is:

A tool holder comprising a casing having parallel side walls, and curved top and bottom walls, all of substantially uniform thickness forming a vertically elongated socket, a pair of interfitting clamping jaws arranged within the socket and having straight parallel sides fitting against the side walls of the socket to preserve the jaws in parallel relation and prevent the rotative movement thereof, the upper and lower curved walls of the casing being each provided with spaced threaded openings, and adjusting screws extending through said openings and bearing on the jaws at points near the opposite ends of the latter, whereby said jaws may be vertically adjusted to varying horizontal positions or to varying angles to the horizontal, the screws serving also as means for forcing the jaws into clamping engagement with the tool.

In testimony that I claim the foregoing as my own, I have hereto affixed my signature in the presence of two witnesses.

WESLIE M. RHOADES.

Witnesses:
 J. M. NOWELL,
 E. M. NOWELL.